Aug. 29, 1950  D. S. GREY  2,520,634
OPTICAL OBJECTIVE EMPLOYING REFLECTING ELEMENTS
Filed Feb. 4, 1949
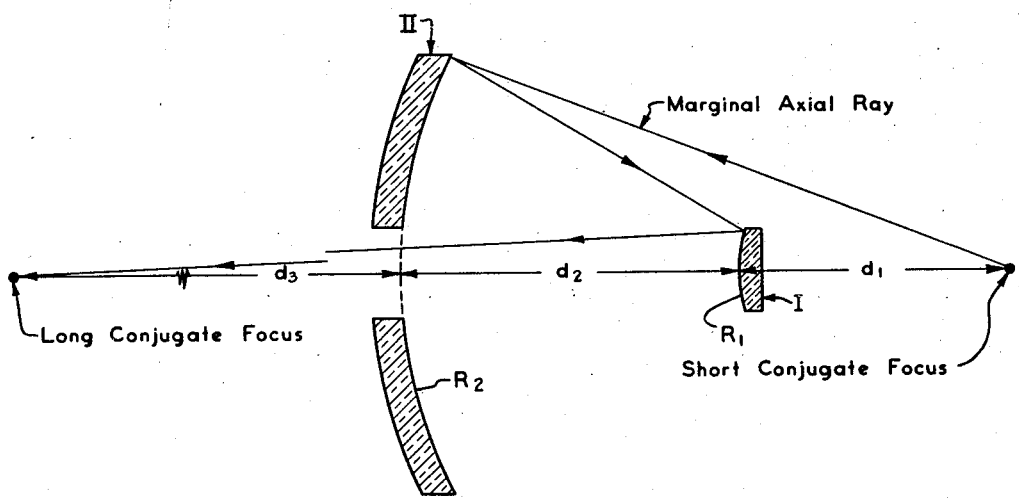
| COMPONENT | RADIUS | DISTANCE |
|---|---|---|
| MIRROR I | $R_1 = 14.0$ | $d_1 = 26.55$ |
| MIRROR II | $R_2 = 47.92$ | $d_2 = 33.10$<br>$d_3 = 716.00$ |
INVENTOR
David S. Grey
BY Donald L. Brown
and Moncure B. Berg
Attorneys Patented Aug. 29, 1950

2,520,634

UNITED STATES PATENT OFFICE 2,520,634

OPTICAL OBJECTIVE EMPLOYING REFLECTING ELEMENTS

David S. Grey, Weston, Mass., assignor to Polaroid Corporation, Cambridge, Mass., a corporation of Delaware Application February 4, 1949, Serial No. 74,563

1 Claim. (Cl. 88—57)

This invention relates to optical systems and more particularly has reference to an objective useful in the fields of microscopy, photography, and projection.

An object of this invention is to provide an improved objective system for use in microscope objectives, photographic objectives, projection objectives and the like and especially to provide a system of this character which is of simple design employing but two elements and which makes use of light-reflecting elements only.

Further objects of this invention reside in the provision of a novel objective for use throughout a region of the electromagnetic spectrum ranging from the medium ultraviolet into the infrared which comprises a plurality of optically aligned mirror elements designed to provide an objective which is substantially free of astigmatism and which is well corrected for spherical aberration and coma and preferably has a numerical aperture at least as great as 0.4.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claim.

For a fuller understanding of the nature and objects of the invention, reference should be had to the following detailed description taken in connection with the accompanying drawing.

The single view of the drawing is a sectional view of an objective lens system which embodies the concepts of this invention and which is disclosed as comprising two optically aligned mirror elements I and II. Mirror element II is provided with an opening extending centrally therethrough and has a continuous concave reflecting surface in surrounding relation to said opening. The mirror I has a continuous convex reflecting surface and is so positioned that its reflecting surface faces the reflecting surface of the element II. Elements I and II, as shown, each have only one optical surface, namely, their respective reflecting surfaces.

As a variation of the design illustrated, the opening through the concave mirror element II may be omitted if this element is provided with an optical surface on both of its faces and if the concave face thereof has an annular shaped area thereon provided with a reflection coating whereby a centrally located uncoated area remains around the optical axis.

The reflecting surfaces of the mirrors I and II are preferably provided by an aluminum coating. Other materials may, however, be employed for reflection coatings such as silver and the like.

Mirror elements I and II are adapted to be carried in a suitable mount (not shown) and in an arrangement whereby the concave reflecting surface of element II faces the short conjugate focus of the objective to the end that light, received on the reflecting surface of one of the mirror elements from an object point, is reflected onto the reflecting surface of the other mirror element and is redirected to a conjugate focus of the objective.

In the drawings, the full line with the arrows thereon illustrates the path direction of light traversing the objective when employed as a microscope objective and traces a marginal axial ray through the objective. When used as a microscope the objective is adapted to be located so that the object being observed is substantially at the short conjugate focus of the objective. For use as a photographic objective the light from the object will traverse the objective in a direction reverse to that indicated in the drawings.

A preferred embodiment of the objective employs a convex element I provided with a convex reflecting surface having a radius of curvature $R_1$ which is of the order of approximately 0.292 times the radius of curvature $R_2$ of the reflecting surface of the concave mirror element II. Under these conditions the reflecting surfaces of the elements I and II are separated by a distance which is of the order of approximately 0.69 times the radius of curvature of the reflecting surface of said concave mirror II.

The embodiment of the invention illustrated in the drawings makes use of curvatures and spacings for the mirror elements I and II of the order just specifically noted. The constructional data with dimensions in millimeters for the specific example of the lens system illustrated is given in the table which immediately follows:

| Component | Radius | Distance |
|---|---|---|
| Mirror I | $R_1=14.0$ | $d_1=26.55$ |
| Mirror II | $R_2=47.92$ | $d_2=33.10$ |
| | | $d_3=716.0$ |

Comprehended as a variation of the specific design disclosed, which falls within the spirit and the scope of the invention, is the reduction or enlargement by equal percentages of the radii and spacing of the design set forth. As a specific example, radii $R_1$ and $R_2$ and spacing $d_2$ may be scaled down to one-half the values shown in the foregoing table. The result of such practice is merely to reduce the physical size of the objective and the long and short conjugate focal lengths thereof by one-half, while maintaining the characteristics of the objective set forth including its numerical aperture, substantially unaltered. Similarly, physical enlargement of the objective may be carried out by multiplying the values given in the foregoing table for radii $R_1$ and $R_2$ and the spacing $d_2$ by a common factor which is greater than one.

A particular advantage of the present invention resides in its provision of an objective which eliminates expensively formed refractive elements while presenting a system which is available for use over a wavelength range extending from the ultraviolet region of the spectrum into the infrared region by the use of simply constructed mirror elements. The mirrors employed make use of spherical surfaces which are corrected for astigmatism and are aplanatic over the wavelength range just mentioned while permitting these conditions to be attained without resort to aspheric surfaces. For uses outside of the field of microscopy it may be desired, at times, to alter the long conjugate focal distance. A method of considerable convenience in altering the long conjugate focal distance, for which the objective is corrected, has been found to consist merely of a minute change in the spacing between the convex and the concave reflecting surfaces. When minute changes in spacing are made the coma correction remains essentially complete.

The objective disclosed is designed to have a numerical aperture of about 0.4 although smaller numerical apertures may obviously be used. Images of good quality may, however, be obtained with numerical apertures up to a value of about 0.5. However, beyond this point zonal spherical aberration becomes excessive. Subject to the maximum limitation just noted, the value for the numerical aperture will, in general, be determined by the use for which the objective is designed.

Since certain changes may be made in the above product without departing from the scope of the invention herein involved, it is intended that all matter contained in the above description or shown in the accompanying drawing shall be interpreted as illustrative and not in a limiting sense.

What is claimed is:

An objective lens system of the character described for use throughout a wavelength range extending from within the ultraviolet region of the spectrum to within the infrared region and comprising two mirror elements constituted by a mirror element having a concave spherical reflecting surface and a mirror element having a convex spherical reflecting surface, said mirror elements being spaced apart axially with said concave reflecting surface facing the convex reflecting surface and also facing the short conjugate focus of the objective and with said concave mirror element having an opening extending centrally therethrough whereby said concave reflecting surface is annular in shape, said system having substantially the numerical data set forth in the following table wherein I and II designate, respectively, said convex mirror element and said concave mirror element, $R_1$ and $R_2$ designate, respectively, the radii of the reflecting surfaces of said mirror elements I and II, and $d_1$, $d_2$ and $d_3$ designate, respectively, the spacing between the short conjugate focus and the convex mirror surface, the spacing between the convex mirror surface and the concave mirror surface and the spacing between the concave mirror surface and the long conjugate focus of said objective:

| Component | Radius | Distance |
|---|---|---|
| Mirror I | $R_1 = 14.0$ | $d_1 = 26.55$ |
| Mirror II | $R_2 = 47.92$ | $d_2 = 33.10$ |
| | | $d_3 = 716.00$ |

DAVID S. GREY.

REFERENCES CITED

The following references are of record in the file of this patent:

UNITED STATES PATENTS

| Number | Name | Date |
|---|---|---|
| 1,967,214 | Acht | July 24, 1934 |
| 2,198,014 | Ott | Apr. 23, 1940 |
| 2,336,379 | Warmisham | Dec. 7, 1943 |

FOREIGN PATENTS

| Number | Country | Date |
|---|---|---|
| 227,346 | Germany | Oct. 20, 1910 |
| 538,622 | Great Britain | Aug. 11, 1941 |
| 61,355 | Denmark | Sept. 27, 1943 |